Sept. 25, 1945.  W. C. GEER  2,385,411
FROST-PREVENTING SCREEN FOR AIRCRAFT WINDOWS
AND METHOD OF MAKING THE SAME
Filed July 20, 1943
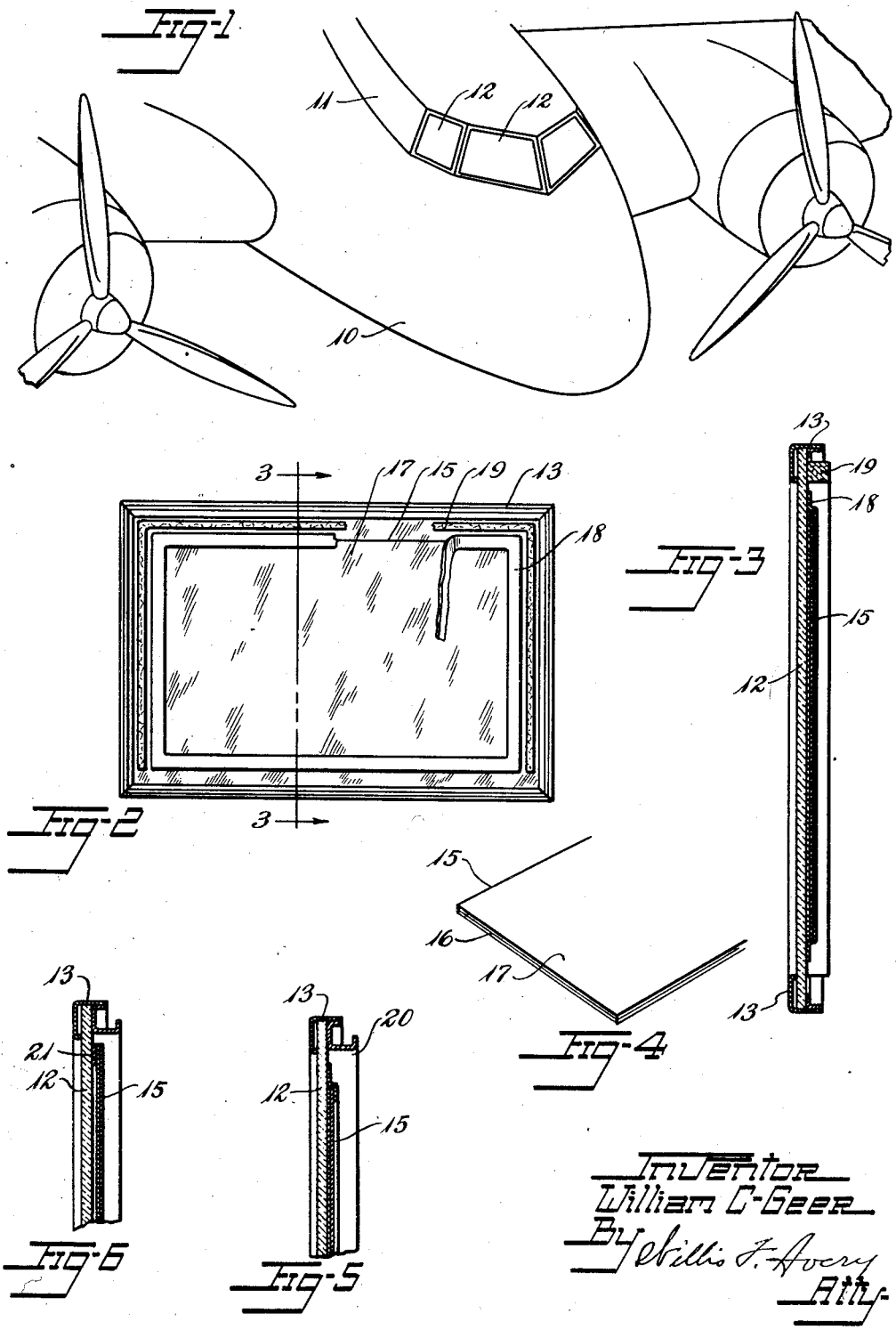

Patented Sept. 25, 1945

2,385,411

UNITED STATES PATENT OFFICE 2,385,411

FROST-PREVENTING SCREEN FOR AIRCRAFT WINDOWS AND METHOD OF MAKING THE SAME

William C. Geer, Ithaca, N. Y.

Application July 20, 1943, Serial No. 495,435

8 Claims. (Cl. 20—40.5)

This invention relates to means for maintaining clear vision conditions on windows of high-flying aircraft, and the like, and is more particularly concerned with protecting aircraft windows against loss of visibility caused by the formation of frost thereon.

When airplanes fly at high altitudes of from 15,000 to 30,000 feet, the inside faces of the windows become coated with frost and the transparency or, more accurately, the visibility through the windows is reduced to zero. This condition is caused by the combination of a low outside temperature, frequently as low as −20 to −40° F., and a relatively high humidity inside the fuselage maintained by moisture in the breath exhaled by the crew. Medical authorities indicate that a person normally exhales from 250 to 400 grams of water each day so that the air inside a large airplane cabin carrying a number of passengers or a large crew will be quite humid. Experienced airplane pilots have stated that at the altitudes and temperatures above-mentioned the frost which forms on the inside of the windows is so dense that it is impossible to see through the windows and that the frost is very difficult to remove even by scraping with a putty knife.

The problem is complicated by the fact that effective protection must be maintained throughout long flights, often of many hours' duration, and because the anti-frost means must not itself interfere with clear vision through the window. Many known frost-preventing expedients cannot be used either because they remain effective only for short periods of time or because they do not permit the requisite clear vision, independently of the presence or absence of frost conditions.

It has been suggested that warm air be circulated constantly across the inside surfaces of the windows to prevent frosting. While effective in some cases, this expedient is not practical in large airplanes as the cost in power and weight of equipment required to prevent frost on all the many windows of a large passenger ship or bomber would be prohibitive.

The present invention accordingly aims to provide simple, economical and efficient means for maintaining good visibility conditions in windows of high-flying aircraft and the like. More particularly, it is an object of the invention to provide a simple and inexpensive screen structure adapted to be associated with an aircraft window and which shall have the capability of protecting the window against frost formation throughout flights of many hours duration and at extremely low temperatures, all without the screen itself interfering in any material respect with clear visibility through the window.

The screen of the present invention comprises a self-supporting sheet structure adapted to be mounted in close relationship with the inner face of an aircraft window or the like. The screen structure preferably includes a transparent sheet base of inert material mounted next to the windowpane and a transparent layer or coating of active material exposed to the atmosphere inside the airplane cabin. The layer of active material is adapted at relatively low temperatures, such as those encountered in high-altitude airplane flight, to absorb and retain in an unfrozen condition substantial quantities of water from a relatively humid atmosphere and is further adapted to discharge the absorbed water when subsequently exposed to relatively higher temperatures and a relatively dry atmosphere after completion of the flight, and thus to recondition the screen for another flight without further treatment. The ability to absorb and retain water in an unfrozen condition, although at low temperatures, continues for many hours and visibility through the screen remains unimpaired throughout the cycle.

Under ordinary unprotected conditions, water vapor in the atmosphere inside the fuselage of an airplane condenses upon the windowpane directly to a solid and forms finely-divided frost crystals, the vapor phase condensing directly to the solid phase. When my frost-preventing screen is used, however, water vapor in the atmosphere adjacent the screen condenses directly into a liquid non-freezing mixture which is absorbed into the active layer of the screen and there retained in liquid condition so that no frost forms. The active water-absorbing layer swells and increases in thickness and weight as the water is absorbed but the absorption and swelling occur uniformly and no optical distortion results.

To be useful in aircraft, the screen must permit clear, undistorted vision of distant objects. Thus, a pilot seated in the usual position with the eyes some 24" to 48" from the windowpane must be able to perceive clearly and distinctly objects as far away as 5,000, 10,000, 15,000, or even 20,000 feet. Mere "transparency" is not enough. Wax paper is "transparent" and permits clear visibility of objects held close to the paper. But a frost screen which exhibited similar properties of "transparency" would be wholly unsuitable for use on aircraft windows. The term "transparent" (and related terms) accordingly is used in this application in its more restricted sense of permitting clear vision of distant objects.

The matter of providing for clear visibility of distant objects is rendered especially difficult because of the companion necessity of providing a substantial thickness of water-absorbing material adequate to receive and to retain the large quantities of moisture present during extended flights. Important aspects of the invention accordingly concern the provision of such combined properties of relatively great screen thickness coupled with clear visibility of distant objects.

In a preferred embodiment of my invention, the active water-absorbing layer of the screen comprises a transparent coating of colloidal proteinous material having uniformly disseminated therethrough a plasticizer for the proteinous material, the plasticizer being miscible with the proteinous material and with water, being non-crystalline at the lowest temperatures to which the screen will be subjected, and having the further property of lowering the freezing point of water. The plasticizer may be either a liquid or a solid so long as it plasticizes the proteinous material to produce a transparent coating and dissolves water to form a mixture which freezes at a temperature lower than the lowest temperature to which the surface of the layer inside the window will be subjected in service.

The thickness of the active layer and the proportion of the freezing point lowering plasticizer must be correlated so that the layer will absorb moisture from the adjacent atmosphere, without the formation of frost, over periods of many hours' duration and at extremely low temperatures, while at the same time retaining perfect visibility characteristics with reference to distant objects together with the ability of the screen to recondition itself by later discharging the absorbed water and drying out before a second flight is undertaken.

It has been found that all these requirements are satisfied if the proportion of plasticizer is substantially within the range 0.5 to 1.2 parts by weight for each 1 part of proteinous material, while the thickness of the layer should be from about 0.01" to about 0.02". Best results are obtained when substantially equal parts by weight of plasticizer and proteinous material are utilized and the thickness is about .015".

As the water-absorbing layer of proteinous material usually does not have great mechanical strength, I usually prefer to mount the layer on a base member or carrier sheet to form a composite self-supporting structure having sufficient mechanical strength to permit ordinary handling without difficulty. Such base member or carrier sheet preferably should be a thin, flexible, strong, and clearly transparent sheet of resinous material which is not swollen or otherwise adversely affected by moisture. Sheets of transparent synthetic resins such as Vinylite and cellulose acetate are quite satisfactory. Base member sheets from 0.005" to 0.015" in thickness have been found to be suitable. Furthermore, an adhesive may be interposed between the base member and the water-absorbing layer to improve the adhesion between the two elements.

It may be found desirable to add a surface hardening agent to the proteinous coating. Most coatings which will absorb water and be satisfactory as a frost preventer are rubbery in character and the surfaces of such materials, although not sticky in the accepted sense, nevertheless, may be marked by finger prints when not carefully handled.

In order to produce an active layer having the requisite clear vision characteristics, I have found it necessary to add to the composition an evaporatable solvent such as water or other appropriate liquid in rather carefully controlled quantities and to sheet or otherwise cast the fluid composition so prepared in the required perfect film form, after which the solvent is evaporated.

The quantity of solvent utilized should be not less than 5 and not more than 10 parts by weight for each 1 part of proteinous material, a ratio of 7 to 1 being preferred.

The following specific example will serve further to illustrate the invention:

20 grams of C. P. glycerine is mixed with 140 cc. of water and 20 grams of high grade, transparent gelatin in finely-divided form is added. The mixture is stirred thoroughly and then allowed to stand overnight at room temperature to swell the gelatin. It was then heated on a water bath at approximately 70° C. for 2 to 3 hours until a complete solution or dispersion of the gelatin had taken place and a homogeneous composition had been produced. Sulfur dioxide then was led into the composition while it was stirred constantly and rapidly, the color changing from a light brown to a clear yellow during this treatment. The sulfur dioxide treatment was continued until the pH of the solution had been lowered from an initial 6.0 down to 4.70, these conditions having been found important in producing a clear film of the requisite optical properties, and particularly in casting a film free of waviness.

To prepare the frost-preventing screen, a sheet of very clear transparent Vinylite, 0.015" thick, was attached to a plate of glass and a dam made of cloth adhesive tape was attached around the edges. This carrier sheet upon glass was placed upon a sheet of plate glass which had been made carefully level by proper supports. Upon this leveled Vinylite sheet a calculated quantity of the above composition was poured so as to make an even distribution of the solution as quickly as possible. For small scale work, it has been found that the solution should be at a temperature of 30–35° C. and the Vinylite sheet as close to that temperature as is practical, when the room temperature was as low as 23° C. The Vinylite sheet and the leveled plate glass were kept in a box surrounded by oiled cheesecloth to prevent the film from becoming dusty. After about three hours, the gelatin solution set to a gel, at which time it was removed and dried in a dust-free air blast.

This operation produced a finished frost screen ready for mounting on an airplane window.

Satisfactory transparent grades of gelatin may be obtained from Thomas W. Dunn Company, New York, N. Y. (Gelatin Lot No. 9386) and from the Eastman Kodak Company, Rochester, N. Y. (Gelatin pract. Catalog No. P1099). Other similar transparent proteinous materials may be utilized although it should be noted that ordinary glue is not satisfactory as it is more or less opaque due to impurities. Similarly, other materials than glycerine may be employed so long as such materials are miscible with gelatin (or other proteinous colloid); namely, which serve as plasticizing agents for gelatin and which at the same time absorb water and lower the freezing point of water. They also must be permanent in the sense that the vapor pressure is low enough so that the quantity of the freezing point lowering plasticizer remains absorbed in the gelatin during any anticipated life of the screen. Viscous polyhydroxy organic liquids in general including glycerine and the various glycols such as propylene glycol may be used. It should also be understood that two or more of such water-soluble freezing point lowering plasticizers may be used simultaneously in the mixture.

The water-absorbing layer prepared as hereinabove described does not become viscous as water is absorbed by it or when it is heated to a temperature of 140° F. Further, the glycerine or other plasticizer does not exude from the coating but is retained therein along with the absorbed water over long periods of time. The combination of Vinylite base member and water-absorbing coating is readily flexible which makes it possible to apply it to the inside of a glass window which is curved.

In the application of this screen to the inside of an airplane window, for instance, I propose to use a cloth-backed pressure-sensitive adhesive tape around the edges of this film combination. Tests have shown that the 1" wide Jonflex cloth masking tape, made by the Industrial Tape Corporation, New Brunswick, N. J., is satisfactory for this purpose. It adheres well to the Vinylite, to the gelatin film and, also, to such structures as the frame around the panes of glass in windshields and other locations in an airplane. In the application of the tape to these surfaces, it is understood that they must be dry and clean. The film combination may be laid directly against the glass which is to protect, without any appreciable air space between. The advantage of the cloth tape is that it is easy and quick to apply and, when desired, quick to remove. Its adhesion down to −40° F. has been found to be good.

It is also possible to mount the screen in slightly-spaced relation to the windowpane by means of a double-faced adhesive tape sold under the name "Double-faced tape," care being exercised to form a tight seal all around the edges of the screen to exclude moisture from the space between the screen and the windowpane.

Also, the Vinylite base may be adhered directly to the glass surface or to a transparent plastic surface such as Plexiglass, by using an adhesive such as Glyptal Cement #1276, made by the General Electric Company, or Vinylite Resin Adhesive XL–5041, made by the Carbide and Carbon Chemicals Corporation. Each of these has been tried under low temperature conditions and found to be satisfactory.

The water-absorbing film must be protected from liquid water. Thus, it is necessary to surround the window, to which the frost prevention film has been attached, by a channel or, preferably, an absorbent layer of fabric. In packing and shipping, the water-absorbing layer of the screen must be arranged in the case or carton so as to prevent contact of the surface with any other substance. A suitable frame for each screen will accomplish this.

The film shows finger prints rather easily. These, however, may be washed off with chemically pure carbon tetrachloride.

If somewhat greater permanence of the film is desired, a hardening agent may be added. There are large numbers of such hardening agents for gelatin. I have found that if formaldehyde is employed for this purpose, and if the hardening is carried to completion, the resulting film may not be satisfactory in that the absorption of water is very slow and moisture is precipitated upon the surface due to the extraction of glycerine from the film. The film strength, therefore, is too great. The most satisfactory hardening agent, which shows excellent results in permanence, has been obtained by adding to the mixture of the foregoing example about 0.2 gram of aluminum chloride, ($AlCl_3.6H_2O$), (0.1 part on the gelatin) dissolved in 25 cc. of water, together with enough concentrated hydrochloric acid to retain the pH of the solution at about 4.70. This requires only a few drops of concentrated hydrochloric acid added to the aluminum chloride solution. This solution is added to the gelatin composition with constant and rapid stirring and the film is then cast as described. The quantity of aluminum chloride may be varied from about 0.005 to 0.1 part by weight to each 1 part of gelatin or other proteinous colloid.

It has been mentioned that the film of the foregoing specific example possesses a surface which is just soft enough to show finger prints and to be marked relatively easily even by such materials as waxed paper. To overcome this difficulty, a surface hardening agent may be added to the mixture. The surface hardening agent preferably comprises one of the class of water-soluble plastics. Reference is made to the "Chemistry of Synthetic Resins" (1935) pages 321, 565, and 760. The particular resin which I tried for this purpose is "Boriresin," supplied by The Beacon Company, 89 Bickford Street, Boston, Mass., which is stated to be a water-soluble synthetic resin which does not freeze or crystallize at −70° C., which is miscible with polyhydric alcohols and forms glossy, transparent, hard, non-tacky films. In a typical case, 2 grams of "Boriresin" is dissolved in 10 cc. of water and mixed with constant stirring, into the composition of the specific example. In order to insure uniformity of mixing without irregular spots, it is necessary to be sure that the pH value is not higher than about 4.70, a small amount of hydrochloric acid being added if necessary to maintain this condition. The resulting film has a hard surface which does not finger print, except with difficulty, and which may be left in contact with waxed paper beneath a light weight for several weeks without becoming marked.

Peculiarly, and for which no reason has been assigned, it has been found that the surface of the film, as described in the example, may be hardened by the addition in water solution of 1–2%, in terms of the gelatin, of trisodium phosphate; namely, $Na_3PO_4.12H_2O$, or of sodium ferrocyanide, $Na_4Fe(CN)_6.10H_2O$, or anhydrous zinc chloride. In the latter case, it is necessary to add sufficient hydrochloric acid to prevent the precipitation of zinc hydroxide.

Frost tests indicate that screens embodying the present invention absorb water vapor from the admosphere and no frost forms upon them at temperatures as low as −40° F. In a test run, a screen made in accordance with the present invention was exposed continuously to severe frosting conditions for 30 hours without any frost whatever forming on the screen. After 47 hours of such exposure only a small area in one corner of the screen had frosted over. In another test, the screen was maintained in contact with air at 83% humidity and a temperature far below the normal freezing point of water for as long as 42 hours with perfect clarity and without noticeable diminution in transparency. As a practical matter, a screen to be useful in combating the frosting problem in high-flying aircraft must be capable of permitting clear vision of distant objects as far as 5,000, 10,000, 15,000, or 20,000 feet away and of maintaining such clear vision characteristics for at least 10 hours while in contact with atmosphere at 50% humidity and a temperature of −40° C. As shown by the tests hereinabove described, applicant's preferred screens far exceed these minimum requirements.

During use the water-absorbing layer swells and increases in weight. Upon removal from the frost conditions and exposure to ordinary room temperature, it dries out in a few hours and is ready for reuse. It may be dried out in a few minutes by directing a blast of warm dry air across the surface of the water-absorbing layer. Large drops of water may cause irregular swelling and loss of optical properties but very fine water drops, such as fog and mist, are absorbed so rapidly and evenly over the surface that the optical properties do not change.

The accompanying drawing illustrates a typical installation of the present invention on an airplane. Of the drawing:

Fig. 1 is a fragmentary perspective view showing a conventional airplane having its cockpit windows protected from frosting by means of the frost-preventing screen of the present invention.

Fig. 2 is an elevational view showing the inside of one of the cockpit windows with the frost-preventing screen thereon, portions of the structure being broken away or stripped back for clarity of illustration.

Fig. 3 is a vertical section taken on line 3—3 of Fig. 2.

Fig. 4 is a fragmentary perspective view showing a screen embodying the invention.

Fig. 5 is a view similar to Fig. 3 but illustrating a slightly modified structure.

Fig. 6 is a view similar to Fig. 5 but illustrating an alternative method of affixing the screen to the windowpane.

The drawing illustrates a conventional airplane 10 having a cockpit 11 provided with several observation windows closed by glass panes 12—12, the panes being mounted in any appropriate frame such as the frame 13.

A frost-preventing screen 15 prepared in accordance with the invention as hereinabove described comprises a transparent sheet base member 16 having adhered to one face thereof a water-absorbing coating 17 of the character previously described. The screen 15 is prepared, or cut, in a size sufficient to cover the area of the window to be protected, preferably substantially the entire window area. The prepared screen 15 then is placed in face-to-face contact with the inside surface of the pane 12, the base member 16 being placed contiguous to the glass with the water-absorbing coating 17 being exposed directly to the atmosphere inside the airplane. The screen 15 then is secured in place against the glass as by strips of industrial adhesive tape 18 placed around the edges of the screen, preferably in such a manner as completely to exclude the outside air from the space between the window and the screen. Obviously, mechanical fastening means such as clamping strips or the like may be substituted for the tape.

For intercepting water tending to drain onto the screen from other parts of the fuselage structure, as when frost forms on the window frame and subsequently melts, a strip of water-absorbing material such as water-absorbent felt or similar fibrous material 19 is provided preferably closely adjacent to the top and side edge portions of the screen 15. The strip 19 conveniently may be simply cemented to the windowpane. In an alternative embodiment illustrated in Fig. 5, the water-absorbing strip may be replaced by a sheet metal gutter member 20, similarly surrounding the top and edge portions of the screen 15 and serving to direct water away from it.

It is also possible to mount the screen 15 in slightly-spaced relation to the windowpane so long as the outside air is excluded from the space between them. Such mounting is shown in Fig. 6, the screen 15 being affixed to the windowpane 12 by means of double-faced adhesive tape 21 placed between the pane and the edges of the screen and extending around the entire periphery of the screen to provide a moisture-excluding seal. In practice, this method of mounting the screen has proved to be especially satisfactory because of its cheapness, simplicity, ease of installation and general effectiveness.

This application is a continuation-in-part of my copending application Serial No. 407,953, filed August 22, 1941.

Although the invention has been described in considerable detail with reference to certain preferred structures, compositions, materials, proportions of materials and procedures, it will be understood that the invention is not limited to such details unless specifically so indicated in the claims, and that numerous variations and modifications may be effected therein without departing from the spirit and scope of the invention as defined by the appended claims.

I claim:

1. The method of making a transparent screen for preventing frosting on windows of high-flying aircraft while permitting clear observation of distant objects through the screen, and for similar purposes, said method comprising mixing 1 part by weight of gelatin with from 5 to 10 parts of water and from 0.5 to 1.2 parts of glycerine, to form a homogeneous composition, treating the composition with sulfur dioxide until its pH has been lowered to about 4.70, adding from .005 to 0.1 part of aluminum chloride to the composition together with sufficient acid to maintain the pH at about 4.70, then applying the composition in a uniform film to a sheet of transparent flexible resinous material which is substantially unaffected by water and which has strength and transparent visibility characteristics substantially equivalent to those of a sheet of "Vinylite" synthetic resin from 0.005" to 0.015" in thickness, and evaporating the water from the film to produce a firm, non-flowing coating of the order of 0.01" to 0.02" thick, the said sheet being supported in a horizontally level position while sufficient water evaporates from the said film thereon to set the film to a non-flowing state.

2. The method of making a transparent screen for preventing frosting on windows of high-flying aircraft while permitting clear observation of distant objects through the screen, and for similar purposes, said method comprising mixing 1 part by weight of gelatin with from 5 to 10 parts of water and from 0.5 to 1.2 parts of glycerine to form a homogeneous composition, treating the composition with sulfur dioxide until its pH has been lowered substantially, adding a small amount of aluminum chloride while maintaining the pH of the solution substantially unchanged, then applying the composition in a uniform film to a sheet of transparent flexible resinous material which is substantially unaffected by water and which has strength and transparent visibility characteristics substantially equivalent to those of a sheet of "Vinylite" synthetic resin from 0.005" to 0.015" in thickness, and evaporating the water from the film to produce a firm, non-flowing coating of the order of 0.01" to 0.02" thick, the said sheet being supported in a horizontally level position while sufficent water evaporates from the said film thereon to set the film to a non-flowing state.

3. The method of making a transparent screen for preventing frosting on windows of high-flying aircraft while permitting clear observation of distant objects through the screen, and for similar purposes, said method comprising mixing 1 part by weight of gelatin with from 5 to 10 parts of water and from 0.5 to 1.2 parts of glycerine to form a homogeneous composition, treating the composition with sulfur dioxide until its pH has been lowered to about 4.70, applying the composition in a thin film to a sheet of transparent flexible material which is substantially unaffected by water and which has strength and transparent visibility characteristics substantially equivalent to those of a sheet of "Vinylite" synthetic resin from 0.005" to 0.015" in thickness, and evaporating the water from the film to produce a non-flowing coating of the order of 0.01" to 0.02" thick, the said sheet being supported in a horizontally level position while sufficient water evaporates from the said film thereon to set the film to a non-flowing state.

4. The method of making a transparent screen for preventing frosting on windows of high-flying aircraft while permitting clear observation of distant objects through the screen, and for similar purposes, said method comprising mixing 1 part by weight of gelatin with from 5 to 10 parts of water and from 0.5 to 1.2 parts of glycerine to form a homogeneous composition, treating the composition with sulfur dioxide until its pH has been substantially lowered, applying the composition in a thin film to a sheet of transparent flexible material which is substantially unaffected by water and which has strength and transparent visibility characteristics substantially equivalent to those of a sheet of "Vinylite" synthetic resin from 0.005" to 0.015" in thickness, and evaporating the water from the film to produce a non-flowing coating of the order of 0.01" to 0.02" thick, the said sheet being supported in a horizontally level position while sufficient water evaporates from the said film thereon to set the film to a non-flowing state.

5. The method of making a transparent screen for preventing frosting on windows of high-flying aircraft while permitting clear observation of distant objects through the screen, and for similar purposes, said method comprising mixing substantially 1 part by weight of gelatin with about 1 part of glycerine and about 7 parts of water, treating the composition with sulfur dioxide until its pH has been substantially lowered, adding a small amount of aluminum chloride while maintaining the pH of the composition substantially unchanged, then applying the composition in a uniform film to a sheet of transparent flexible material which is substantially unaffected by water and which has strength and transparent visibility characteristics substantially equivalent to those of a sheet of "Vinylite" synthetic resin from 0.005" to 0.015" in thickness, and evaporating the water from the film to produce a non-flowing coating of the order of 0.01" to 0.02" thick, the said sheet being supported in a horizontally level position while sufficient water evaporates from the said film thereon to set the film to a non-flowing state.

6. The method of making a transparent screen for preventing frosting on windows of high-flying aircraft while permitting clear observation of distant objects through the screen, and for similar purposes, said method comprising mixing substantially 1 part by weight of gelatin with about 1 part of glycerine and about 7 parts of water, treating the composition with sulfur dioxide until its pH has been substantially lowered, applying the composition in a uniform film to a sheet of transparent flexible material which is substantially unaffected by water and which has strength and transparent visibility characteristics substantially equivalent to those of a sheet of "Vinylite" synthetic resin from 0.005" to 0.015" in thickness, and evaporating the water from the film to produce a non-flowing coating of the order of 0.01" to 0.02" thick, the said sheet being supported in a horizontally level position while sufficient water evaporates from the said film thereon to set the film to a non-flowing state.

7. A transparent screen adapted to be associated with a window-pane or the like for protecting it against loss of visibility caused by the formation of frost thereon, as when one side of the pane is exposed to a cold atmosphere and the other side to a humid atmosphere, and for similar purposes; said screen comprising a self-supporting sheet structure comprising a layer of transparent proteinous material of a colloidal nature having uniformly disseminated therethrough a plasticizer for the proteinous material; said plasticizer being miscible with the proteinous material and with water, non-crystalline at the lowest temperature to which the screen is to be subjected, and having the property of lowering the freezing point of water; the colloidal material also containing aluminum chloride; the said layer being adapted at relatively low temperatures to absorb and retain in an unfrozen condition substantial quantities of water from a relatively humid atmosphere and being further adapted to discharge the absorbed water at relatively high temperatures to a relatively dry atmosphere, all without materially affecting visibility through the screen.

8. A transparent screen adapted to be associated with a window-pane or the like for protecting it against loss of visibility caused by the formation of frost thereon, as when one side of the pane is exposed to a cold atmosphere, and the other side to a humid atmosphere, and for similar purposes; said screen comprising a self-supporting sheet structure comprising a layer of transparent proteinous material of a colloidal nature having uniformly disseminated therethrough a plasticizer for the proteinous material; said plasticizer being miscible with the proteinous material and with water, non-crystalline at the lowest temperature to which the screen is to be subjected, and having the property of lowering the freezing point of water; the layer also containing a water-soluble resin adapted to harden the surface of the proteinous material; the said layer being adapted at relatively low temperatures to absorb and retain in an unfrozen condition substantial quantities of water from a relatively humid atmosphere and being further adapted to discharge the absorbed water at relatively high temperatures to a relatively dry atmosphere, all without materially affecting visibility through the screen.

WILLIAM C. GEER.